United States Patent [19]  
Escobedo

[11] 3,762,272  
[45] Oct. 2, 1973

[54] SELF-ADJUSTING EXTENSIBLE GEAR TRAIN AND ASSEMBLIES CONTAINING SAME

[75] Inventor: Francisco Escobedo, Inglewood, Calif.

[73] Assignee: Fresco Industries, Inc., Gardena, Calif.

[22] Filed: Dec. 23, 1971

[21] Appl. No.: 211,279

Related U.S. Application Data

[63] Continuation-in-part of Ser. No. 32,805, April 29, 1970, Pat. No. 3,690,220, which is a continuation-in-part of Ser. No. 731,494, May 23, 1968, Pat. No. 3,526,167.

[52] U.S. Cl.............. 90/11.58, 90/15, 90/DIG. 11, 74/384, 74/397
[51] Int. Cl. ....... B23g 1/32, B23c 9/00, F16h 35/00
[58] Field of Search............. 90/11.58, 15, DIG. 11; 74/384, 397

[56] References Cited
UNITED STATES PATENTS

| 3,589,237 | 6/1971 | Strohecker et al. | 90/15 |
| 3,249,017 | 3/1966 | Strohecker et al. | 90/15 |

*Primary Examiner*—Francis S. Husar
*Attorney*—Howard L. Johnson

[57] ABSTRACT

Annular housing originating or receiving a rotary drive shaft carries a transversely displaceable housing selectively shiftable in a straight line and containing a rotary shaft driven thereby which is laterally displaceable, by movement of the transverse housing, to either side of coaxial alignment of the two shafts. The pair of shafts are rotatable as a unit, even during such displacement of the driven shaft, by a connecting train of three gears, the intermediate of which has its shaft offcenter-traversing a partially rotatable plate which separates the drive gear and driven gear near the intersection of the two housings. In addition to the rotatable plate, self-aligning means includes a flat transverse link having one end rotatable about a boss of the rotary plate which embraces the offcenter intermediate shaft; the other end journals the driven shaft and projects a parallel stud which serves as a pivot point for the link during an intermediate segment only of the total shift of the displaceable (driven) gear between its two extreme positions, during such segment of travel the stud passing along a short guide channel of the primary housing. The driven gear can power a rotary tool projecting from an outer end of the transverse housing; axial rotation of whole assembly including primary housing causes distal tool to sweep annular area, the radius of which is variable by displacement of the transverse housing. Helical movement of the assembly causes distal cutter to form screw threads on a workpiece. Further advantage is obtained by a tiltable positioning head for the distal rotary cutter, which tilt may increase the radial span as well as enable angular positioning of the cutter shaft relative to workpiece.

16 Claims, 26 Drawing Figures

United States Patent [19]
Escobedo

[11] 3,762,272
[45] Oct. 2, 1973

INVENTOR.
FRANCISCO ESCOBEDO
BY
Howard L. Johnson
ATTORNEY

PATENTED OCT 2 1973 3,762,272

INVENTOR.
FRANCISCO ESCOBEDO
BY
Howard L. Johnson
ATTORNEY

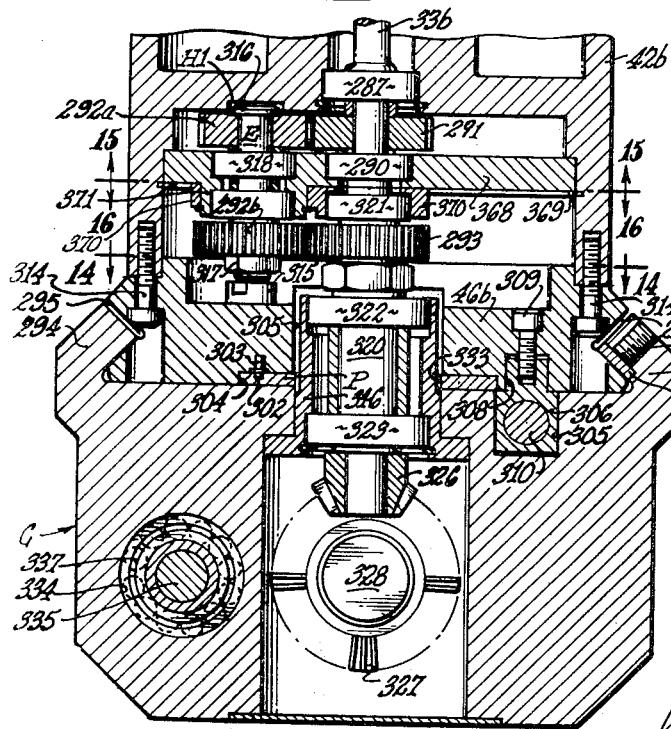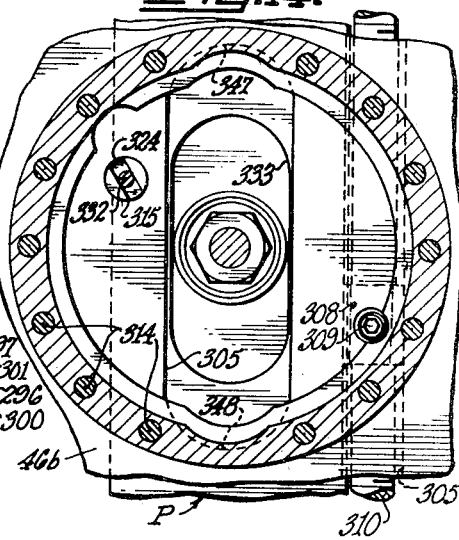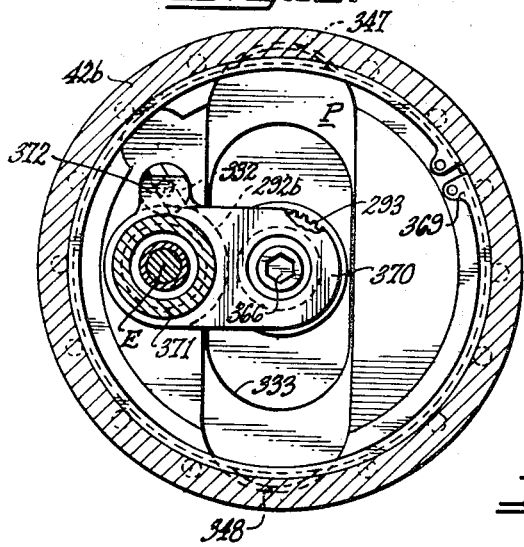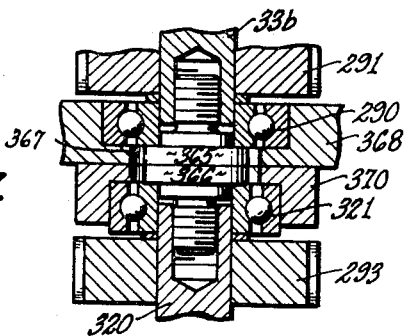

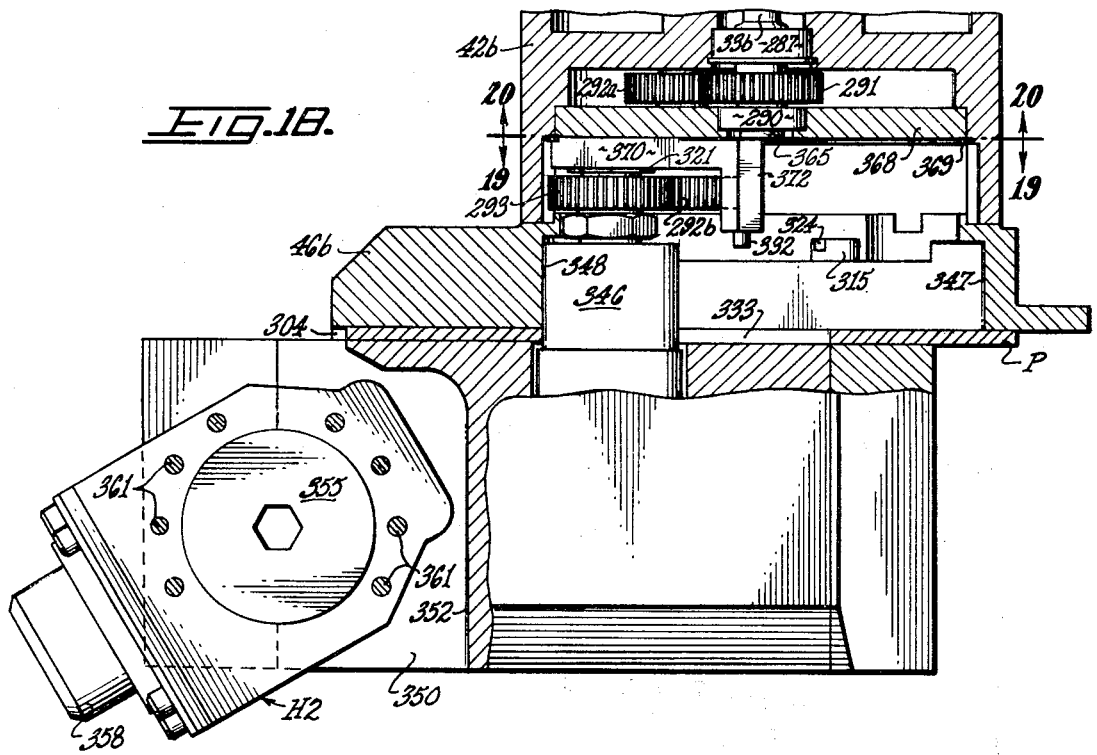
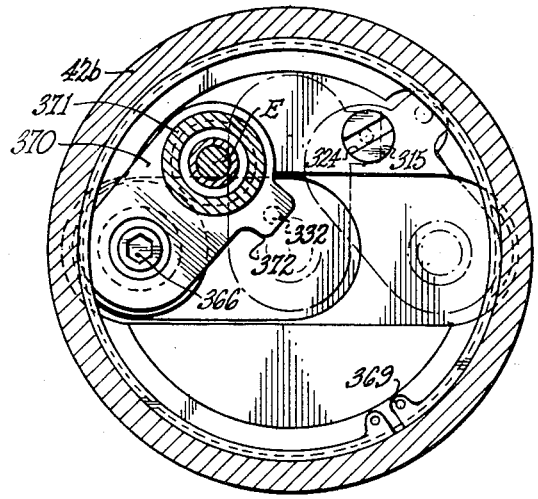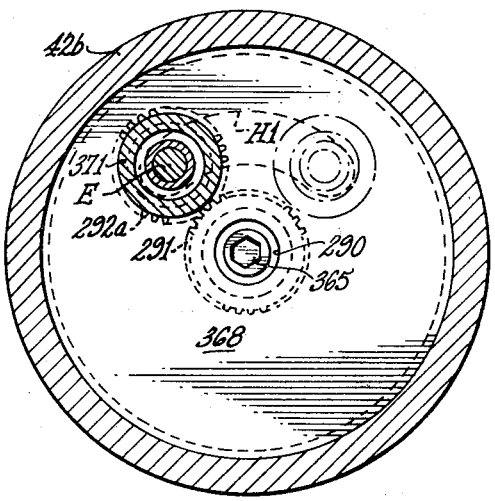
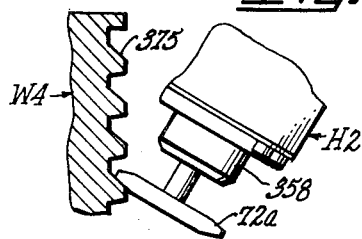

PATENTED OCT 2 1973　3,762,272

INVENTOR.
FRANCISCO ESCOBEDO
BY
Howard L. Johnson
ATTORNEY

INVENTOR.
FRANCISCO ESCOBEDO
BY
Howard L. Johnson
ATTORNEY

SELF-ADJUSTING EXTENSIBLE GEAR TRAIN AND ASSEMBLIES CONTAINING SAME

This is a continuation-in-part application of Ser. No. 32,805, filed Apr. 29, 1970, now U.S. Pat. No. 3,690,220, which is a continuation-in-part of my application Ser. No. 731,494, filed May 23, 1968, now U.S. Pat. No. 3,526,167.

The present invention provides a pair of axially alignable (end to end) shafts having their adjacent ends connected by a gear train in such manner that one shaft may be moved laterally in a straight line (that is, transverse to its axis, in a direction of the plane of the gears) to either side of a medial position of coaxial, longitudinal alignment with the other shaft, while the connecting gear train is automatically extended or retracted in a self-adjusting manner. In its simplest form the pair of shafts may merely serve as (non-rotating) positioning members which have their relative locations changed as required, by operation of the positive connection of the gear train, such straight line displacement being always measurable and hence reproducible.

However, if one shaft is a rotary drive shaft and the other a rotary driven shaft, such transverse or sidewise displacement does not interrupt the continuous driving connection provided by the gear train from one shaft to the other. Essentially a trio of gears is employed, with the reciprocable shift of the intermediate gear being restricted to an arcuate path. A coaxial guide member (rotary plate) which lies along the plane of separation of the drive gear and driven gear is transected by the intermediate gear shaft; and movement of the plate shifts the intermediate gear. The plate is formed with a rotary bearing surface (dependent boss) concentric with the intermediate gear or shaft, about which boss swings a flat, pivotal link which permanently connects the intermediate gear and the displaceable gear or shaft. Adjacent its latter end, the link also has an axially projecting stud which during only a part or intermediate segment of the complete shift of the driven shaft from one extreme to the other, transiently functions as a pivot for the link by movement in a non-radial guide channel.

A few constructions which utilize the present gear train are here illustrated. As noted in the abstract, a linearly shiftable housing carrying the driven gear and shaft, can be mounted along a diametric guideway of a primary housing which holds the drive shaft and gear, the intermediate gear unit connecting both housings. Consequently, transverse shift of the second (i.e. carried) housing will effect the automatic extension or retraction of the gear train to a corresponding extent. The shifted housing can then be locked at the desired position, and by reference to a calibrated scale, can always be reset at any previous or measured position. Such a transverse housing can carry transmission means (e.g. another gear train, or endless cable, etc.) to convey power from the driven shaft to the ultimate end of the slide housing where it can operate a rotary tool such as a milling cutter, fly cutter, grinding/polishing disk, etc., in some instances the slide housing being progressively moved lengthwise as a bore is formed in a workpiece. Further, as by use of bevel gears in the power train, such a distal cutter can be located in a positioning head which is tiltable or rotatable in relation to the slidable housing, so that the cutter can be disposed at an adjustable angle relative to the workpiece.

The advantages of this are many. For example, in making an undercut in a workpiece, it is easier to adjust the position of such cutter than to change the position of the workpiece, especially when the latter is bulky or heavy. In addition, if the primary housing (which may or may not contain the prime mover for the distal tool) is itself axially rotatable, the rotary tool at the far end of the shfitable housing will sweep a circle, the radius of which varies with the transverse positioning of the shiftable housing, that is, with the amount that the gear train is extensible. The shaft which drives the extensible gear train can itself be driven by yet another operating shaft which is spaced inward toward the rotational center of the primary housing, thus increasing the effective radius over which the distal rotary tool can sweep when the gear train is fully extended. Finally, the assembly, including the primary housing can be moved helically, in paths of variable pitch, by the construction shown in my U.S. Pat. No. 3,526,167 so that the rotary cutter will cut threads outside or inside a cylindrical workpiece, the shiftable housing being set to accommodate the radius of the bore or external diameter of the particular workpiece. Thus, tubes or cylinders which are so large as to be difficult to rotate, can be readily threaded, particularly by use of the tiltable positioning head which can slant the cutter so as to form either undercut or perpendicular walls of thread channels when desired. The cutting edge itself may be slanted angularly to its shaft.

The drive shaft of the extensible gear train may be connected to a milling machine by an axially displaceable drill stem as shown in my U.S. Pat. No. 3,526,167. Or the drive shaft may be that of an electric motor carried, for example, by the primary housing. Difference in pitch of the threads being cut is obtained by use of interchangeable pairs of threadedly-engaged guide cylinders, one of which is held by the primary (rotatable) housing, and the other by a fixed mount which is telescopically connected thereto. The helical path which is set by the engaged guide cylinders is thus transferred by the distal cutter to the workpiece as a pattern of screw threads. Advance and retraction of the unit carrying the rotating cutter along the helical path can also be programmed and/or power driven, if required. However manual operation of this aspect is often preferred, in order that the operator may transiently hold or (even repeatedly) reverse the position of the rotating cutter along a segment of its path as may be considered necessary as a result of continued visual inspection of the progress of the work.

A particularly effective association of the present self-adjusting gear train in a helically tracking assembly having a tiltable positioning head carrying a rotary (thread) cutter, is here illustrated, the tiltable head being particularly adapted to augment the initial radial span provided by the extensible gear train.

The shiftable gear train shown in my U.S. Pat. No. 3,526,167 allows a driven shaft to be displaced between a coaxial and an offset position which is radially outward to one side only of the drive shaft. In contrast, the present construction enables it to be displaced diametrically, that is, to either side of the drive shaft (in response to slide movement of the transverse housing along the guideway of the primary housing). This greater result is achieved by automatic coordination of (a) the rotatable plate 368 which offcenter journals and hence arcuately moves the intermediate gear shaft E as the plate is rotated approximately 90° between extreme positions, (b) the eccentrically pivoted link 370 which continuously connects the arcuately moving intermediate gear shaft E with the linearly displaceable shaft 320, and (c) the auxiliary offcenter guide means (non-radial guide channel 324 and pivot stud 332) which provide pivotal engagement for the shifting link during only a limited and critical portion of its total move, that is, starting at aligned or coaxial position of the displaceable shaft it guides the shift of the latter, principally toward one extreme in a non-symmetirc swing of the link, scissors-like.

Looked at another way, the structure shown in my U.S. Pat. No. 3,526,167 enables lateral displacement of the driven shaft to one side only, from coaxial alignment with the drive shaft; the composite structure employed herein, enables shift to either side of coaxial alignment, and permits the automatic effectuation of this in response to transverse movement of the longitudinal housing which carries the driven shaft. It will be apparent that incorporation of such self-adjusting extensible gear train in the here illustrated examples of a thread cutting machine is just one of the many complexes in which it may be incorporated.

It will be seen that the path followed by the displaceable (driven) shaft is diametric to the axis of the drive shaft, and the quadrant of which the peripheral curve defines the arcuate guideway (which arc is followed by the shaft of the intermediate gear as moved by the rotary plate) is located in the center of a semicircular area inscribed from such diameter, that is, bounded by two radii which are each 45° from the diametric line. Within the 90° quadrant, the eccentric pivot point of the link is centered in the peripherally-outward, non-radial guide channel 324 at such time as the link is at midposition (90° or perpendicular to the diametric path), that is, when the drive shaft and driven shaft are coaxial. Transient pivotal engagement of the sliding link is then necessary to prevent binding by gear force being self-applied as a tortional force to the plate 368.

FIG. 13 is a transverse axial sectional view taken through the lower portion of FIG. 3 at right angles thereto, with portions in elevation.

FIG. 14 is a sectional view taken along the line 14—14 in FIG. 13.

FIG. 15 is a sectional view taken along the line 15—15 in FIG. 13.

FIG. 16 is a sectional view taken along the line 16—16 in FIG. 13.

FIG. 17 is an enlarged detail, in axial section, showing adjacent shaft ends which carry the first and last gears of the split-trio gear train, the transverse center line of this figure corresponding to the upper section line of FIG. 13.

FIG. 18 is an axial sectional view taken at right angles to FIG. 13, partly in elevation, with the undercarriage at its extreme left position.

FIG. 19 is a transverse sectional view taken along the line 19—19 of FIG. 18.

FIG. 20 is a transverse sectional view taken along the line 20—20 of FIG. 18.

FIG. 21 is a schematic view of a position taken by the cutter of FIGS. 3–20 in cutting buttress threads.

Figure 26:
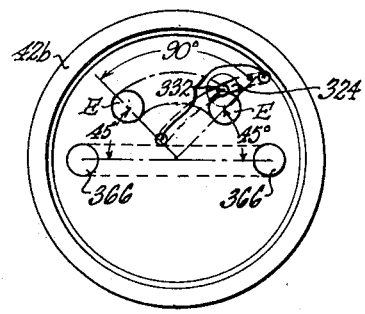

FIG. 26 is a diagrammatic representation transverse to the rotatable housing parallel to the plane of the extensible gear train and link plate, showing the maximum range of movement of the driven shaft 320, the intermediate shaft E, and the pivot stud 332, the latter effecting the scissors action of the gear train by its passage along the channel 324 during a portion of the movement of the rotary plate 368.

Figure 1:
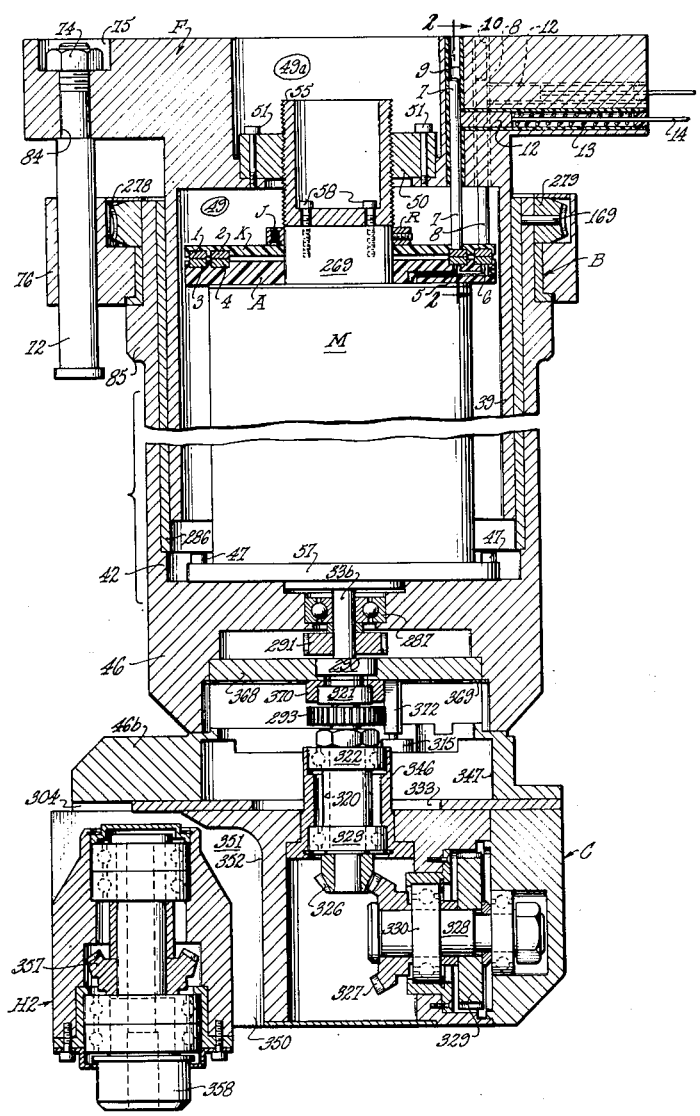
FIG. 1 is a longitudinal axial sectional view through an electric motor driven, helically tracking, thread cutting assembly which embodies the self-adjusting extensible gear train.
Figure 2:
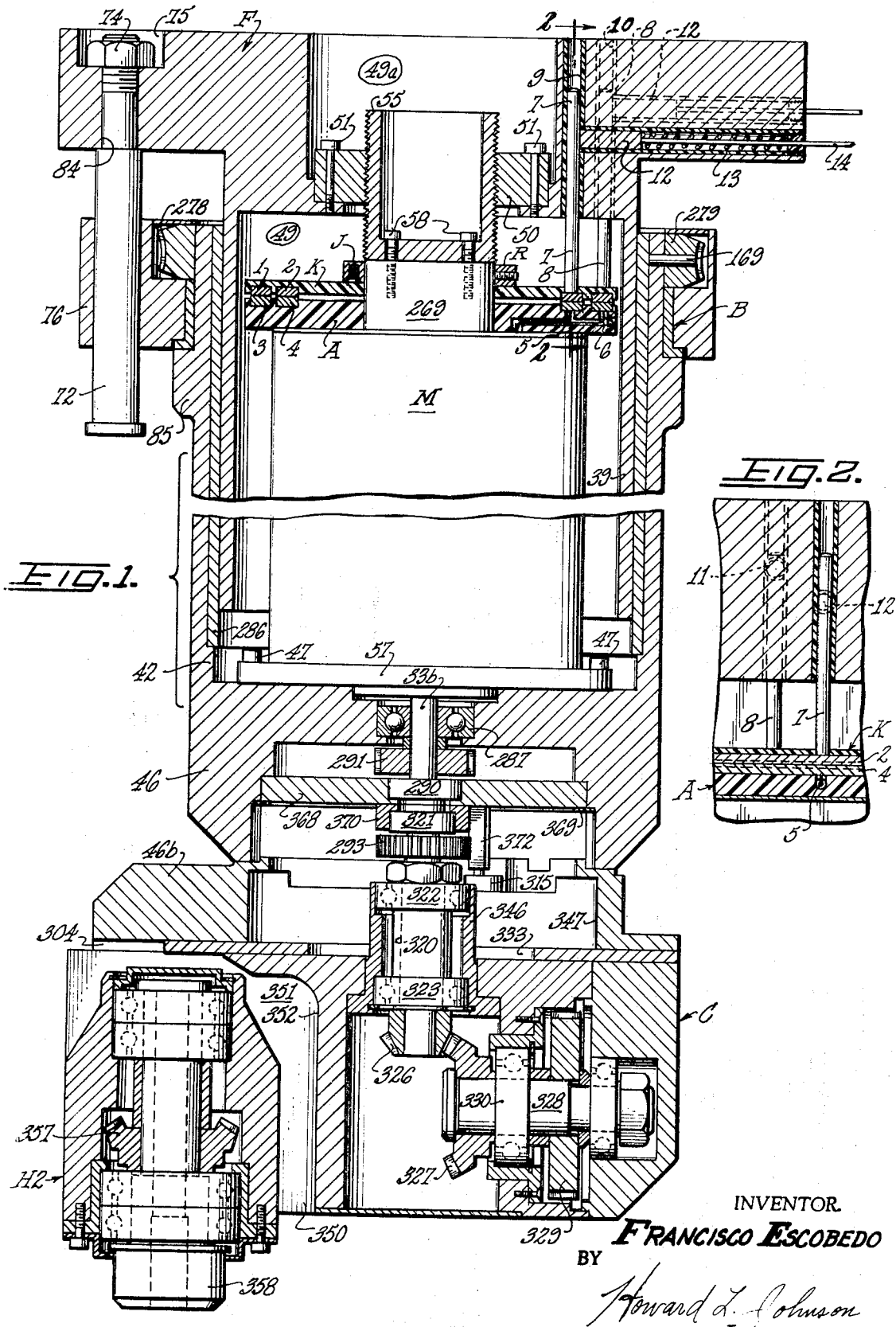
FIG. 2 is a detail of a sectional view taken along line 2—2 in FIG. 1, showing the longitudinally displaceable electrical contact elements.
Figure 3:
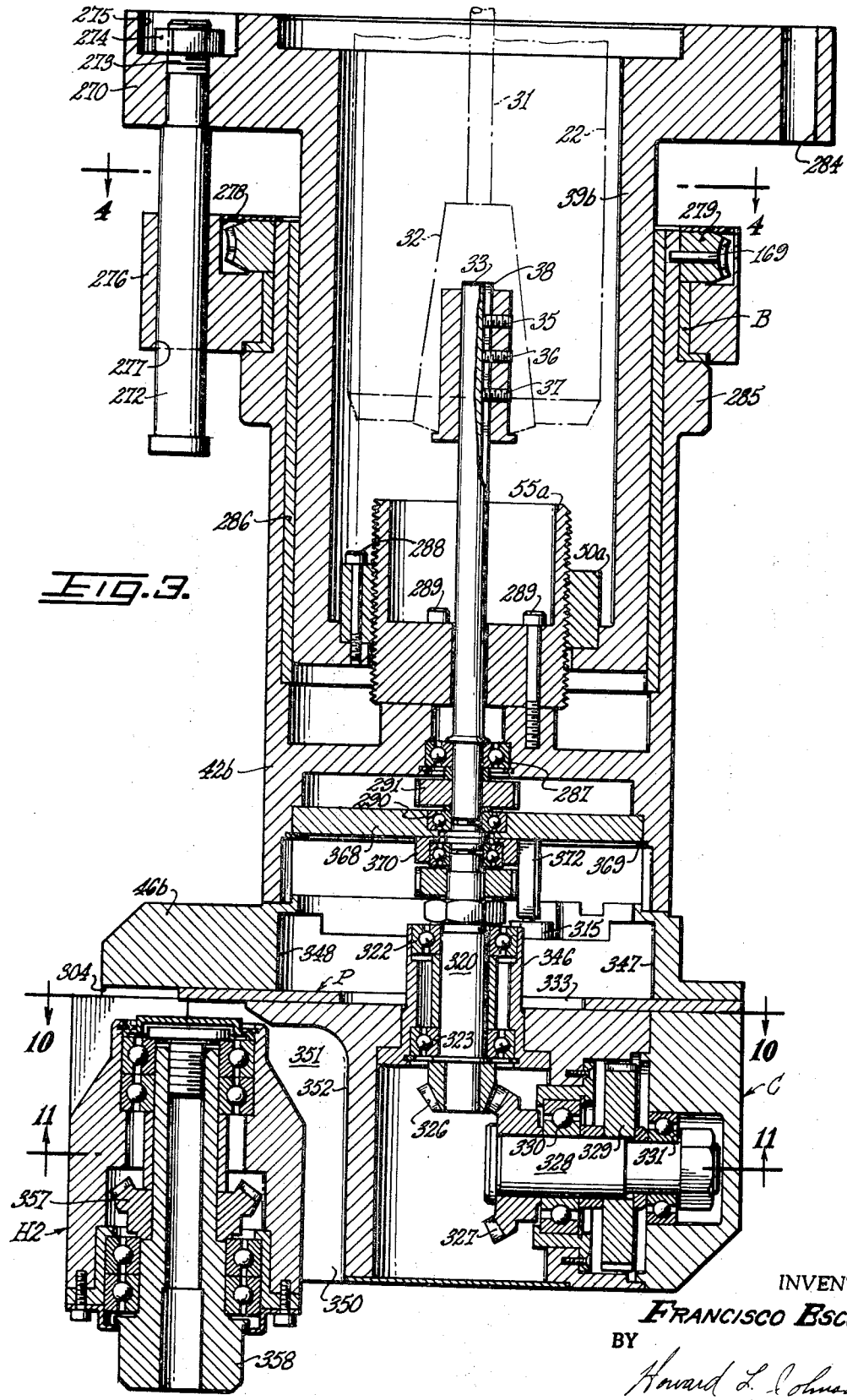
FIG. 3 is a longitudinal axial sectional view, partly in elevation, taken through a helically-tracking, thread cutting assembly containing the present self-adjusting extensible gear train, the rotary cutter of the assembly being driven by connection to the spindle of a milling machine, through such gear train.

The thread cutting assemblies of FIG. 1 and FIG. 3 are similar in structure and operation, but the former contains its own power source (electric motor M), while the latter is adapted to be connected to a milling machine (not shown), the spindle of which rotates the axially displaceable drive stem 33b. The former therefor can be moved from place to place and more readily positioned than the latter assembly which requires attachment to a relatively stationary milling machine.

Figure 4:
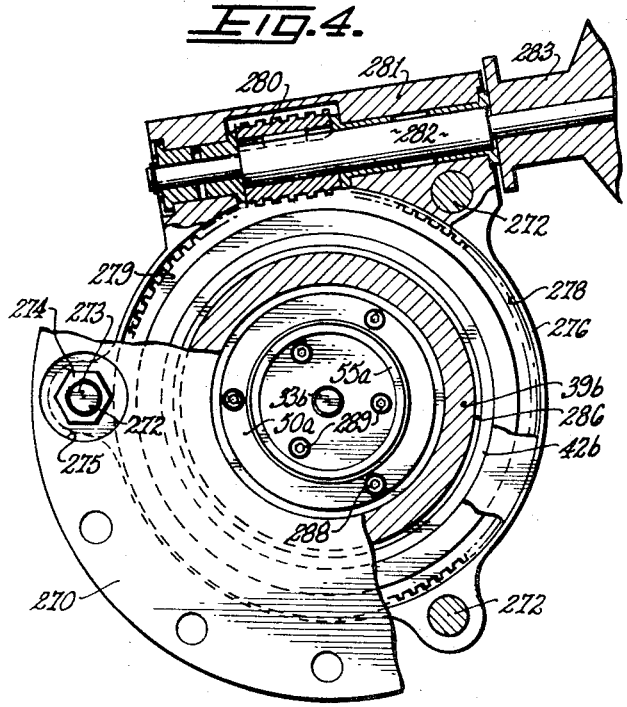
FIG. 4 is partially a plan view and partially a transverse sectional view, as seen along line 4—4 of FIG. 3.

In the construction of FIG. 1, there is an annularly flanged base or frame F which projects an open-ended fixed tube or telescopic cylinder 39 which is outwardly separated by a bearing sleeve 286 from a surrounding, axially removable, telescopic cylinder 42. Outer cylinder 42 is rotatably mounted by means of an embracing annular band 76 separated from an external boss 85 of the cylinder by an L-shaped bearing sleeve B. A ring gear 279 is located in recess 278 of the band and fastened to the cylinder 42 by pins 169. The ring gear is engaged by a worm gear 280 so as to be manually operable by a technician by means of a handle 283 (FIG.4). As described in greater detail for the construction of FIGS. 3-21, rotation of the outer telescopic cylinder 42 by the handwheel 283 causes the sliding cylinder 42 to move in a helical track or path as determined by the pitch of the pair of guide cylinders 50, 55. The telescopic cylinder 42 carries with it the rotatable gear housing 46 and the transversely adjustable undercarriage C which latter at its outer end disposes a selectively locatable positioning head H projecting a tiltable distal spindle 358 for a rotary cutter to engage a workpiece. Longitudinal component of the helical movement of the assembly is effected by the annular structure 76 moving lengthwise along a series of suspension bolts 72 which are each anchored by a nut 74 in a corresponding bore 84 and recess 75 of the frame F. It will be understood that the circle of suspension bolts 72 which determine the orientation of the movable portion of the assembly may be disposed either vertically or horizontally (or at some intermediate angle) as required by the situation of a particular workpiece. Likewise the frame of base F can be mounted on roller elements or be carried in a self-propelled vehicle.

The electirc motor M of FIG. 1, is mounted, by bolts 47, on base plate 57 which forms the inner end cover for the rotatable housing 46. Thus it is located within the cavity 42x of the movable telescopic cylinder 42 and extending into the coaxial cavity 49 of the fixed telescopic cylinder 39. At the other end of the motor M (the top as viewed in FIG. 1) there are two axially separated disks of insulating material A and K, centered about an axial core 269 to which the threaded guide cylinder 55 is secured by a circle of screws 58 which are coaxial to a larger circle of screws 51 which attach the engaged guide cylinder 50. Both members of the pair of threadedly engaged guide cylinders 50, 55 are thus removable and replaceable (as by a pair having a different pitch) through an axial opening 49a of the base F.

The disk A is fixed to the motor housing M and rotates with it. The adjacent disk K does not rotate but moves with the motor, being held in position about the core 269 by the band R which holds successive springs J which exert axial tension against the disk K. Each of the disks on their adjacent faces carry two concentric rings 1, 2, 3, 4 of electrical conducting material such as copper, the opposing members of each pair (i.e., 1 & 3, 2 & 4) being in sliding registration so as to enable the passage of electric current therebetween. The conductor rings 3, 4 of the rotating disk H are connected to plus and minus terminals of the motor by respective conduits 5, 6, extending through the body of the disk. The opposing rings 1, 2 of the disk K are electrically connected to conductor rods 7, 8 which are each slidable lengthwise in respective tubular channels 9, 10 while being in wiping or sliding contact with respective lateral contacts 11, 12 which may be of the bar-type or resilient wire brush type members which are maintained in frictional registration in the conductor rods by tension springs 13 surrounding their respective electrical conduits 14 which latter thus enter the base F from an external source of electricity. Thus it will be seen that electricity continues to flow through the drive motor M while the latter follows a helical path in either direction.

The construction of FIGS. 3-21 has a fixed, inner telescopic cylinder 39b which from an annularly flared, attachment plate 270 dependently disposes a circle of terminally flanged, suspension bolts 272, each having their upper extremity 273 threaded and anchored by a nut 274 located in a socket recess 275 of the plate. An encircling retainer band 276 is apertured at 277 for sliding insertion of the respective suspension bolts 272 and in an inner annular recess 278 positions a ring gear 279 which is outwardly secured to the outer telescopic cylinder 42b. At one side the ring gear is engaged by a worm gear 280 (FIG. 4) which is lodged in a laterally projecting housing 281 and carried by an operating shaft 282 which can be manipulated in either direction by a handle 283 so as to rotate the outer telescopic cylinder 42b. As in the previous construction, the inner face of the retainer band is separated from the outer cylinder 42b by a thrust bearing B, the lower end of which rests on a protruding annular ledge 285 of the cylinder. The whole assembly may be fastened onto the end plate of a milling machine by bolts inserted through the circle of openings 284 of the attachment plate 270. The outer telescopic cylinder 42b may carry an internal bearing sleeve 286 which is in sliding contact with the inner cylinder 39b.

Internally or axially, the telescopic cylinders are coupled together by a threadedly engaged pair of guide cylinders or inserts 50a, 55a, the pitch of which determines the helical movement which the outer cyilnder 42b follows relative to the inner cylinder 39b in response to actuation of the ring gear 279 by the worm gear 280. As in the earlier forms, the mating pair of guide cylinders may be removed and replaced by a similar pair having thread of another pitch, by withdrawal of the circle of screws 288 (for the fixed guide cylinder 50a) and 289 (for the movable guide cylinder 55a) — FIGS. 3-4.

The axially movable drive stem 33 (fastened to the spindle of a milling machine as in FIG. 3 distally is journalled in two axially spaced, ball bearing assemblies 287, 290 (FIG. 3, 13) between which it carries a gear 291. The latter is the initial or drive unit of a split-intermediate trio or gear train (291, 292a, 292b, 293) which is arranged for the earlier-noted scissors action while maintaining continuous transmission of the rotary drive to the ultimate driven gear 293 of the trio; in the present instance, shift of the third gear being effected in a straight line by claibrated movementof the undercarriage C.

Figure 9:
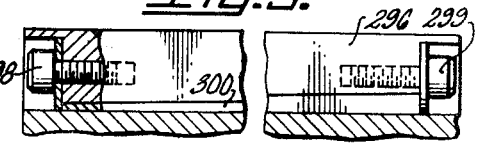
FIG. 9 is a sectional view taken along line 9—9 of FIG. 8, showing the tapered adjustment wedge.
Figure 7:
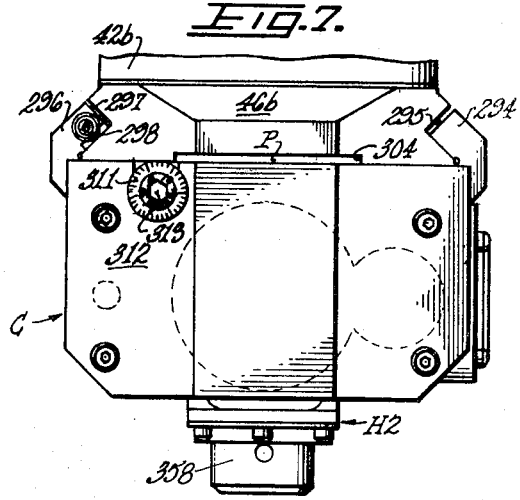
FIG. 7 is an end elevational view as seen from the left of FIG. 5.
Figure 5:
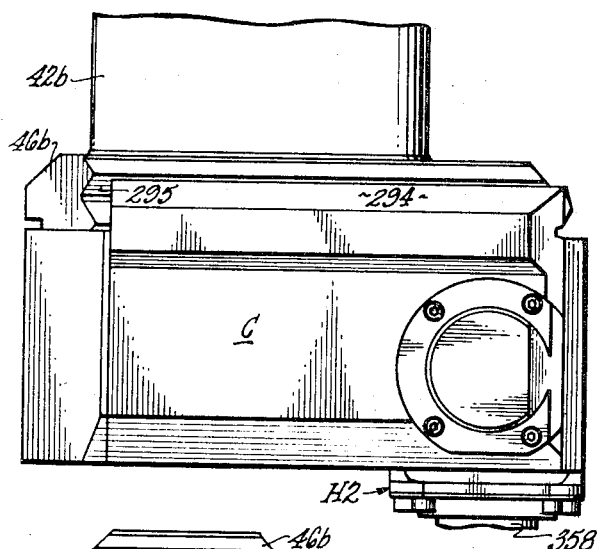
FIG. 5 is a side elevational view of the lower portion of FIG. 3, as viewed from the rear of FIG. 3, or as seen from the left side of FIG. 8.
Figure 8:
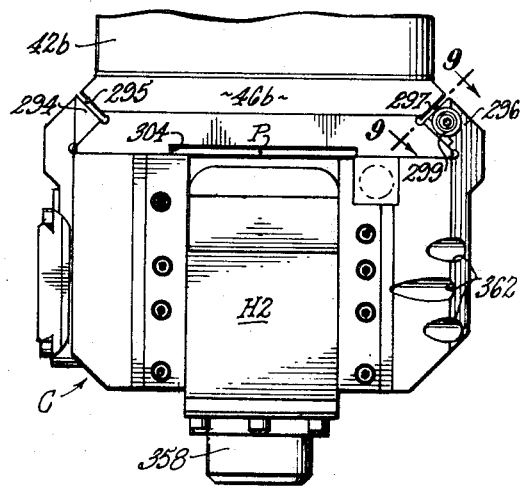
FIG. 8 is an elevational view of the opposite end of FIG. 7.
Figure 6:
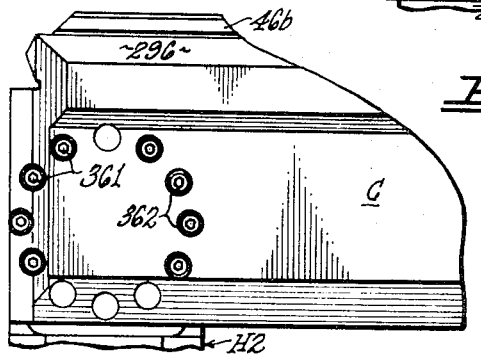
FIG. 6 is a fragmentary elevational of the right side of FIG. 8.
Figure 10:
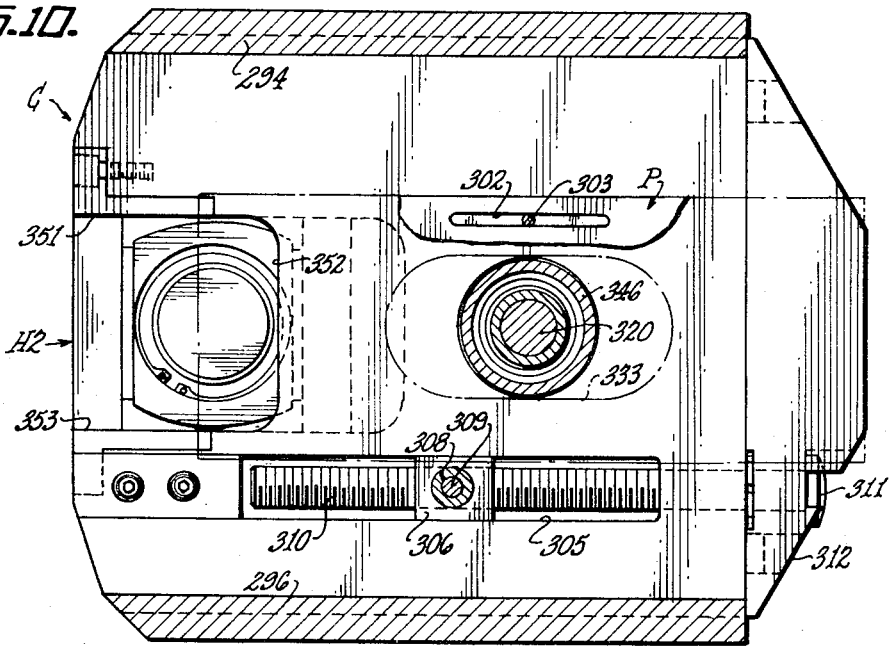
FIG. 10 is a transverse section along line 10—10 of FIG. 3.
Figure 11:
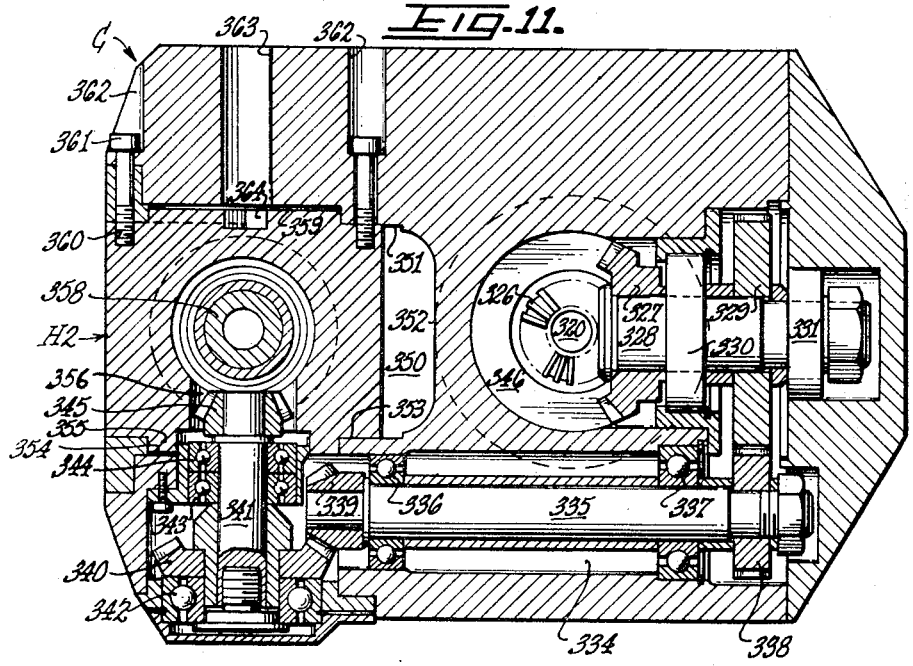
FIG. 11 is a transverse section along line 11—11 of FIG. 3.
Figure 12:
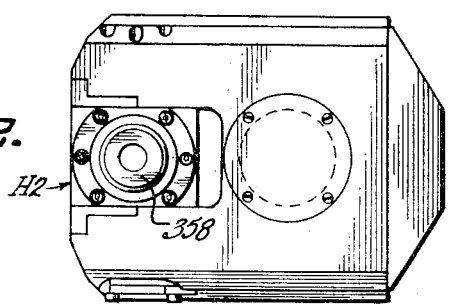
FIG. 12 is a bottom plan view of FIG. 5, on a smaller scale.

The laterally-projecting body of the rotatable housing 46b is fastened to the bottom of the rotatable tube 42b by a circle of screws 314 (FIGS. 13, 14) and dependently carries a transversely adjustable undercarriage C of enerally rectangular shape. The two upper, longitudinal edges of the carriage C are each formed with a convergingly directed or angularly inslanted, attachment shoulder 294, 296 (FIG. 7, 13) which are retained longitudinally slidable in corresponding slideways of channels 295, 297 of the opposite sides of the gear housing 46b and fastened by set screws 301 (FIG. 13). In assembly, a tapered wedge 300 which serves as a bearing surface is inserted along one slideway 297 and secured to the shoulder 296 by a washer-retaining screw 298, 299 at each end (FIG. 9).

A shallow longitudinal slide channel 304 is formed in the underface of the housing 46b and receives a flat slide plate P having an open oval centre 333. The plate serves as a grease seal for the chamber above it. A bottom-opening, longitudinal slot 302 in the top of the slide channel, receives a stop pin 303 (FIGS. 10, 13) upstanding from the slide plate P, so as to provide limits of travel of the slide in each direction with movement of the undercarriage. The upper face of the carriage C is also formed with another open-top rectangular channel 305 (FIGS. 13, 14) which houses a longitudinally tapped block or nut 306 having an upward-projecting portion received in a socket 308 of the housing 42b and anchored by a screw 309. A longitudinal positioning screw 310 is threadedly received through the nut 306 with its socketed head 311 disposed at an end-face 312 (FIG. 7) of the carriage and there restrained against longitudinal movement. Accordingly, the positioning screw 310 can be rotated in either direction by a wrench (not shown) inserted into its end socket 311, thereby sliding the undercarriage C in one direction or the other along the underface of the gear housing 42b. Calibration indicia around the end face of socket 311 of the positioning screw provide a gage of the linear movement of the carriage and enable its subsequent return to any previous setting.

The two intermediate gear portions 292a and 292b are fixedly connected to the laterally movable shaft E, the upper cap 316 of the latter being slidable along an arcuate guide slot H1 (FIG. 15) in extension and retraction of the gear train. A mounting nut 317 is on the bottom threaded end of the shaft E. The two portions of the diametrically split, intermediate gear are on opposite sides of a rotatable plate 368 which is retained in the annular housing 42b by a snap ring 369. The plate is axially apertured at 367 for insertion of the respective shaft end cap screws 365, 366 (FIG. 17) but no shaft traverses the aperture. However, the plate is traversed off-centre by the shaft E, and a link plate 370 is juxtaposed against its underface. The link plate is restrictedly rotatable jointly about a dependent boss 371, FIG. 13, of the rotatable plate 368 and about the shiftable bearing assembly 321. A post 372 (FIG. 18) projects downward from the link 370 (FIG. 18) along one side edge thereof, with a dependent pin 332 which passes lengthwise through the guide channel 324 of a housing-floor boss 315 upon movement of the gears and link 370. This transitory anchorage gives a pivot point for the rotatable plate 368.

The driven shaft 320 and its bearing assemblies 322, 323 are retained in a tubular housing insert 346 as a composite unit. This is displaceable between the alternate housing recesses 347, 348 (FIG. 16) upon longitudinal movement of the undercarriage C, which by concurrent limited rotation of the plate 368 in conjunction with the link 370 produces the scissors action of the gear train.

The bevel gear 326 carried by the shaft 320 engages another bevel gear 327 of a transverse shaft 328 which also carries another gear 329 between bearing assemblies 330, 331. In a longitudinal chamber 334 of the carriage, formed at one side of and generally parallel to the shaft 328, is a longer shaft 335 journalled in axially spaced bearing assemblies 336, 337 and on one end carrying a spur gear 338 in mesh with the gear 329. Distally it carries a bevel gear 339 which engages a bevel gear 340 of a transverse inward-directed shaft 341. The latter is journalled in three bearing assemblies 342, 343, 344 and terminally carries a bevel gear 345 (FIG. 11) which acts as a drive gear for the positioning head H2 as described below.

The end of the carriage C which projects the greater amount laterally from the lower telescopic cylinder 42b (left in FIGS. 3, 18) is formed with a central generally rectangular or cubical recess 350 defined by three upright walls 351, 352, 353, overhung by the housing 46b and partially by the plate P, with the outer end and bottom of the recess open. The recess forms a socket or pivot mount for a positioning head H2 which carries the ultimate, rotary (thread) cutter 72. The upright side wall 353 is formed with an annular groove or raceway 354 (FIG. 11) surrounding the bearing assembly 344 shaft 341 and bevel gear 345 which axially project therethrough from within the carriage. An annular shoulder 355 of the head H2 is rotatably seated in the groove 354 with the carriage bevel gear 345 extending through an axial opening 356 of the head to engage a bevel gear 357 (FIG. 11) carried by a spindle 358 within the body of the head H2. The opposite side 359 of the head H2 carries an annular boss which is socketed in the recess wall 351. A circle of tapped bores 360 in the side of the head, receive anchoring screws 361 inserted through the outward-opening bores 362 of the carriage. A cylindrical bore 363 in the side of the carriage axial to the head H2 gives access for a wrench to engage the hexagonal socket 364 and thus to relocate the head angularly (i.e., tilt) when the anchoring screws 361 are absent.

With the tiltable head H2, any milling cutter such as the buttress-thread cutter 72a of FIG. 21 can be positioned within the open-top bore of a stationary workpiece, and by helical movement of the rotatable housing 42b in either direction, it cuts a buttress thread 375. It had not been possible to do this previously. While the tiltable head construction has been described with particular reference to this advanced usage, it will be apparent of course that it can also cut external threads and a milling cutter carried by such a head can also perform ordinary milling tasks. Further advantage is obtained by reason of the transverse adjustability of the undercarriage. Also, when the head is thus tilted, a cutter of lesser diameter can be employed and thus reduce the cutting force required as compared with a cutter of greater diameter.

In the construction detailed in FIGS. 22-25, the outer telescopic cylinder 42c terminally carries the rotatable gear housing 46c which contains the scissors gear train and is formed in an elongated bottom opening 380 through which the tubular housing insert 346 projects as in the previous form. The insert tube 346 is secured in a top-opening cavity 376 of the undercarriage C2 and anchored by screws 377, 378 which traverse a flange 379 of the tube 346. The latter contains the ball-bearing assemblies 322, 323 for the driven shaft 320 which latter disposes the bevel gear 326 in the interior of a transversely displaceable housing or undercarriage C2. The undercarriage C2 is saddle-shaped like an inverted "U", so as to pivotally dispose the positioning head H3 between the arms of the "U". Two upper, parallel sides 382, 383 (FIG. 23) of the undercarriage are formed with elongated grooves 384, 385 in which corresponding square-section rails 386, 387 are fixedly mounted. The U is movable (transversely to the telescopic structure (lengthwise to the undercarriage) by the structure affixed to the rails 386, 387, being pushed along corresponding side channels 388, 389 which are formed adjacent the end of the rotatable housing 46c. Limit screws 390, 391 project into the respective channels from the side walls 392, 393 so as to provide terminal abutments to retain the rails therein after mounting, and prevent the undercarriage from being separable from the housing 46c in use. However, as seen from FIG. 22, the length of the rails 386, 387 is less than that of the undercarriage, so that the latter in one extreme position may extend beyond the periphery of the rotary housing 46c and hence project the distal spindle 71b and cutter 72b against a workpiece along an arcuate path or spiral track having a circumference of greater diameter than that described by the revolving housing 46c or undercarriage C2.

Adjacent the outer end 381 of the rotatable housing 46c are opposing parallel lines of cylindrical apertures 395, 396 marginal to the respective side channels 388, 389, which apertures are alignable (upon lengthwise movement of the undercarriage C2) with corresponding, tapped bores 397, 398 of the undercarriage, so as to jointly receive a series of headed positioning bolts 399, 400 which thus secure the slidable undercarriage C2 at a selected location along the transverse channels 388, 389.

The positioning head H3 is swingably held between the two "U" arms 402, 403 of the undercarriage C2, the one arm being formed in a central, transverse cylindrical opening 404 which is filled by an annular plug 405 having an outer flanged head 406 seated in a surrounding annular recess 407 and retained by screws 408. The inner cylindrical end 409 of the plug projects beyond the inner face of the arm 402 and extends into a cylindrical recess 410 of the adjacent side of the housing 411 of the positioning head H3 so as to form a trunnion-like bearing surface. Outwardly surrounding the face of the bearing plug 405 is a large circle of countersunk bolts 412 which traverse bores 413 of the U-arm 402 and are threadedly received in sockets 414 of the positioning head so as to lock the head (and its projecting rotary cutter 72b) at a selected position of a theoretical arc which connects the two extreme positions shown in FIGS. 22 and 25. In the latter position, the outtilted head is additionally secured by a bolt 415 which from a recess 416 of the undercarriage is inserted through a bore 417 and threaded into the socket 418 of the positioning head when the flat-top wall 419 of the latter is thus held in frictional registration with the crosswall 420 of the undercarriage.

The side of the positioning head which is opposite the trunnion mount 409 is journalled by an annular bearing sleeve 422 (FIG. 23) which is secured within an opening 423 of the inner face of the U-arm 413 by a circle of screws 424. The annular portion 425 of the positioning head rotates about the outer face of the bearing sleeve 422 as the corresponding annular portion 426 opposite thereto rotates about the trunnion 409.

The cutter-carrying positioning head H3 which is swingable in a plane between the U-arms 402, 403 by being pivotally mounted on the opposing trunnion 409 and bearing sleeve 422, houses two parallel, rotary shafts 430, 432 (FIG. 25) spaced along this same plane, the longer of which (432) serves as the ultimate spindle and carries the distal cutter 72c (FIG. 25) or 72b (FIG. 22) which rotary cutters obviously may have different shapes adapted to the particular work.

The arrangement and operation of these last two driven shafts 430, 432, will now be described, followed by their driving connections, going back to the extensible gear train. What may be termed the "swingable" shaft 430 is centered in three ball-bearing assemblies 434, 435, 436. The upper assembly 434 is retained in a cup-shaped, annular holder 438, which together with a cover 439 is lodged in the larger end of an axial cavity 440 by screws 441. A nut on the threaded end of the shaft is tightened against the inner race of the bearing assembly 434, which at its other end rests on the shoulder 437. The lower portion of the shaft is of smaller diameter 442 and successively carries a bevel gear 443 and a spur gear 444. A nut 445 on the outer threaded end of the shaft 430 tightens the inner races of the bearing assemblies 435, 436 against a spacer 446.

The spindle 432 is mounted on two inner 448, 449 and three outer 450, 451, 452 ball-bearing assemblies (FIG. 25), and intermediate its length disposes a spur gear 454 which is driven by the spur gear 444 of the adjacent parallel shaft 430. A spacing collar 455 separates the gear 454 and the bearing assembly 449 surrounding a stepped portion 456 of the spindle. A nut 457 on the inner threaded end of the spindle 432 tightens the inner races of the bearing assemblies 448, 449 against the collar 445. A cap 458 spacedly overlies the end of the spindle and rests on a washer 459 which presses on the outer races of the bearing assemblies 448, 449.

The spindle 432 is tubular, with the terminal length radially enlarged, externally from the shoulder 456, and internally from the shoulder 460, so as to snugly receive an inserted plug 462 to which the cutter 72c is fastened by a bolt 463. The inner end of the mounting plug has a threaded socket 464 which receives the threaded end of a bolt 465 inserted lengthwise from the inner end of the spindle with its head seated in a socket 466.

The outer end of the positioning head H3 is detachable casting or cover 470 which is fastened to the housing 411 by screws 471 and internally is formed with an annular inturned flange or shoulder 472 which provides an abutment for the outer races of the bearing assemblies 450, 451, 452. The inner races are lodged against the shoulder 473 of the spindle. An apertured cap 474 is threadedly mounted on a cylindrical projection 475 of the casting 470, the bulbous end 476 of the spindle projecting therethrough.

Within the U-arm 403 is a transverse shaft 480 (FIG. 23) journalled in ball-bearing assemblies 481, 482, and carrying a spur gear 486 and a bevel gear 483, which latter engages the bevel gear 443 of the swingable shaft 430. Threaded ends of the transverse shaft each have terminal nuts 484, 485 which exert axial tension along the inner raceways and the stack formed by the respective spacers 487, 488 and the shaft shoulder 489. The tensioning nut 485 and the outer end of the transverse shaft 480 are spacedly overlaid by a cover plate 490 fastened by screws 491 to the outer face of the U-arm 403.

Figure 24:
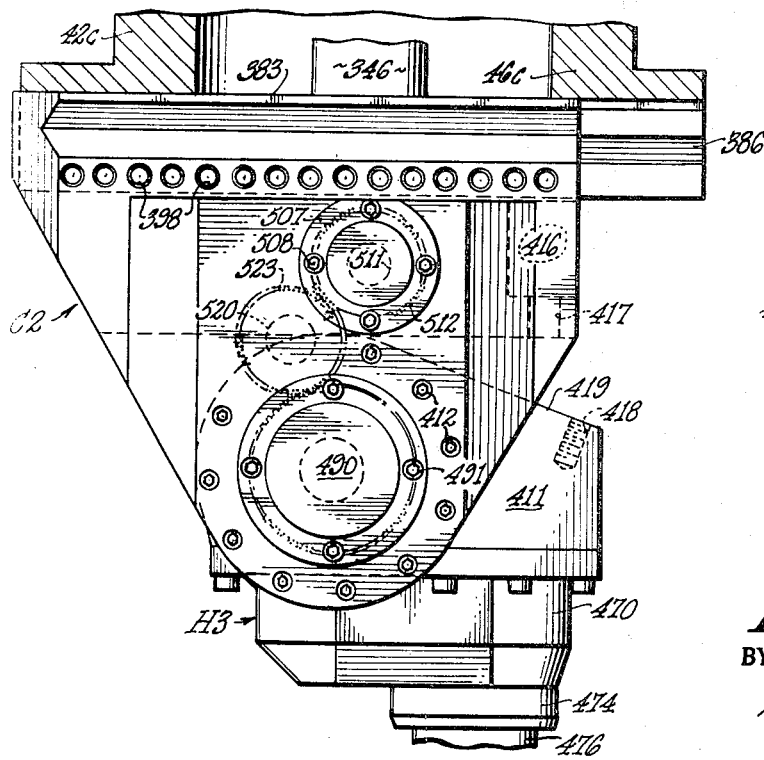
FIG. 24 is a lateral elevational view of the construction of FIG. 22 with the spindle assembly in the linear position of FIG. 23 and the transverse housing at the neutral, or axially aligned position relative to the extensible gear train.

Parallel to the transverse shaft 480 (and to the swing axis of the positioning head H3), the wide portion of the undercarriage C2 which joins the two inverted-U arms 402, 403, is traversed by a cross passage 493 which houses an elongated, transverse shaft 495 supported in three ball-bearing assemblies 496, 497, 498. A radially enlarged length 499 carries the bevel gear 500 which is driven by the bevel gear 326 dependent from the shaft 320 of the tubular housing insert 346 extending from the extensible gear train. The inner end of the shaft length 499 abuts a shoulder 501, while the threaded end 502 carries a nut 503 which presses the inner race of bearing assembly 496 against a spacer 504. An externally threaded nut 505 mounted within the tapped end of channel 493 lodges the outer bearing race against the inturned shoulder 506 and a cover plate 507 closes the mouth of the cross passage 493, held by a circle of screws 508 (FIG. 24).

To the right of the shoulder 501 (as viewed in FIG. 23) the shaft 495 is of smaller diameter, allowing clearance for a terminal nut 349 of the shaft 320, and thence fixedly lodging a stud 510 in an axial bore of a final shaft portion 511 which carries a spur gear 512 located between the pair of ball-bearing assemblies 497, 498. A terminal nut 513 tensions the inner bearing raceways and spacers 514, 515 against an abutment shoulder 516 of the shaft portion 511. A cover plate 517 is retained by screws 518, spacedly overlying the end of shaft portion 511. Angularly offset from the extended transverse shaft 495 (511) is a stub shaft 520 (FIGS. 23 and 24) retained by a pair of ball-bearing assemblies 521, 522 and carrying a spur gear 523, which transmits rotary drive along the U-arm 403 from the gear 512 to the gear 486, shaft 480 and its gears 483 and 486 as the former drives the bevel gear 443.

In summary, the driven shaft 320 of the extensible gear train (extending through the housing insert 346 from the rotatable housing 46c to the transversely displaceable undercarriage C2) by its bevel gear 326 drives the bevel gear 500 of shaft 495. Spur gear 512 on shaft 495 drives gear 523 which drives gear 486 of shaft 480. Bevel gear 483 of shaft 480 drives bevel gear 443 of shaft 442. Spur gear 444 of shaft 442 drives gear 454 of spindle 432 which carries the distal cutter 72c (72b).

Figure 23:
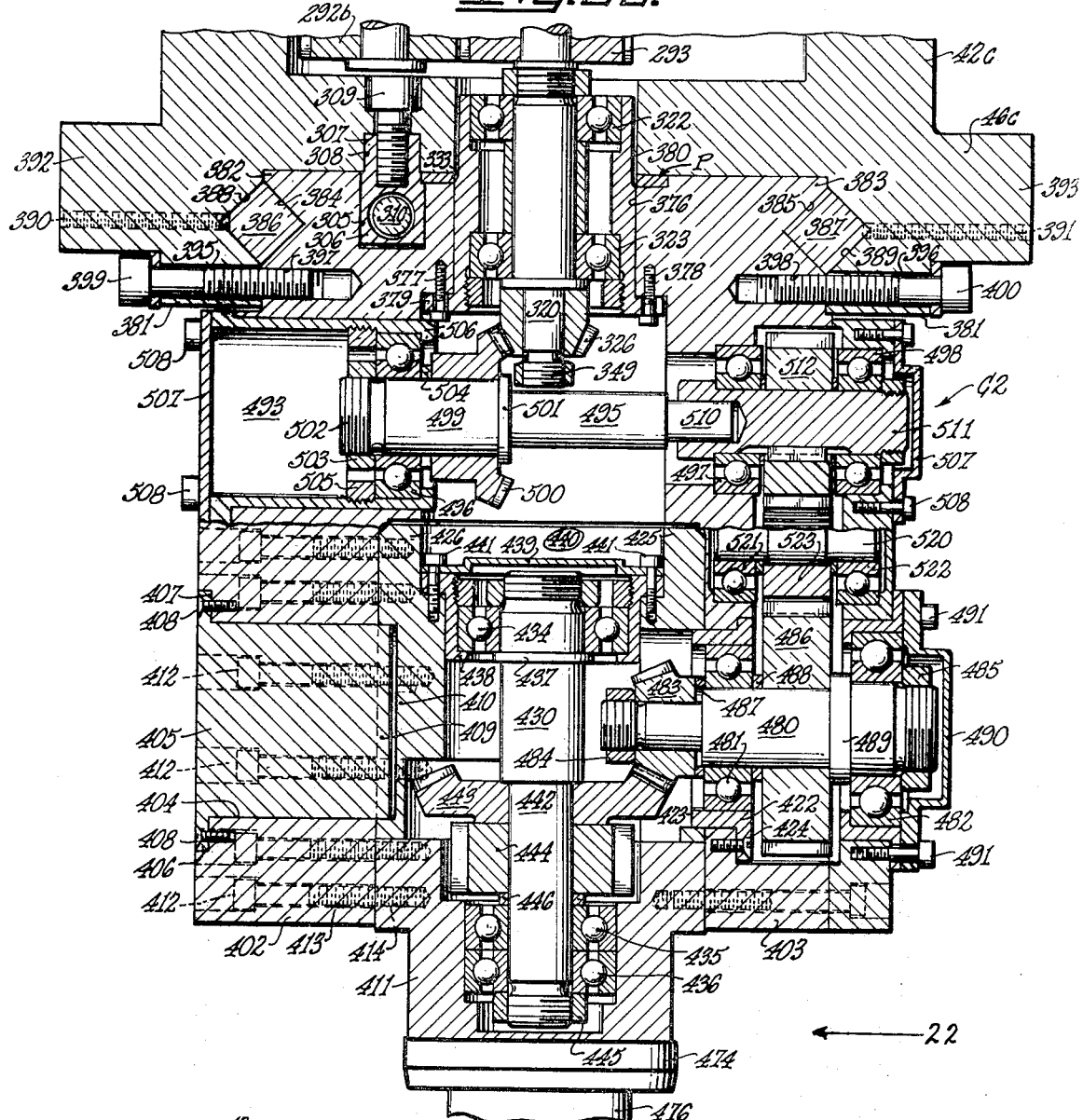
FIG. 23 is a longitudinal sectional view through the assembly of FIG. 22 taken along the staggered line 23-23 of FIG. 25, with the terminal spindle assembly rotated 90°, as in FIG. 24, and the end broken away.
Figure 22:
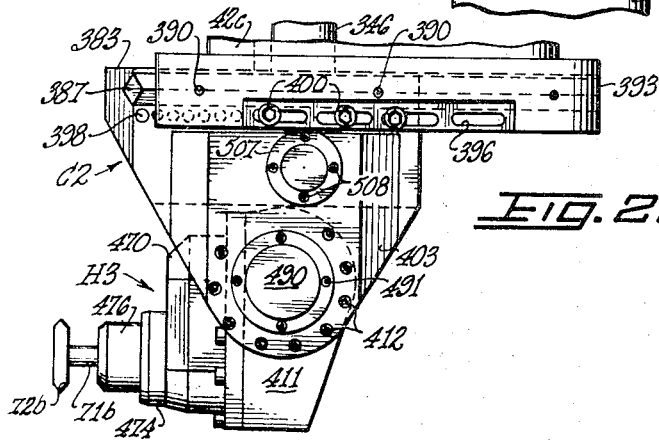
FIG. 22 is a lateral elevational view of another angularly adjustable head construction which forms the operating end of such a helically tracking assembly distal to the extensible gear train, the transverse housing being at its extreme left position and the positioning head shown swung to the extreme left in the same plane, the figure being viewed in the direction of the arrow of FIG. 23.
Figure 25:
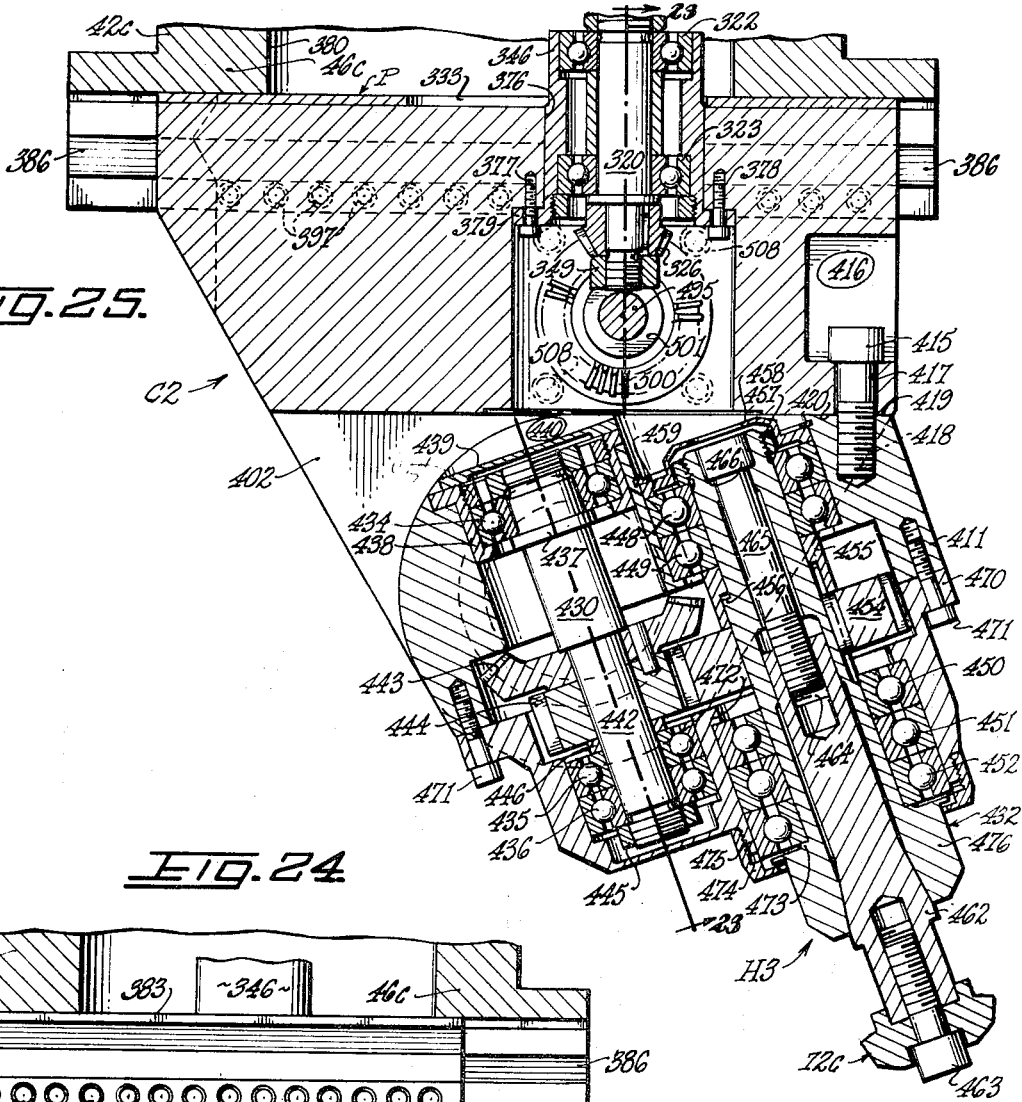
FIG. 25 is a longitudinal sectional view of the preceding construction with the transverse housing positioned by the extensible gear train seen at its extreme right position and the spindle assembly uptilted counterclockwise and locked in this extreme position which is used especially for heavy thread cutting.

The transverse undercarriage C2 (as seen in FIG. 23) is movable toward and away from the viewer (to the extent permitted by the opening 380 (FIG. 25) in the end of the rotatable housing 46c) so as to displace the driven shaft 320 linearly to either side of the drive shaft 33b by movement of the intermediate shaft E and its carried gears 292a and 292b. At any point along this shift path, the positioning head H3 can be swung (and locked) between the two extreme positions shown in FIGS. 22 and 25, so as corrrpondingly to slant the distal rotary cutter 72c or 72b relative to a workpiece. The rotatable housing 46c is then moved arcuately or helically by the handle 283 to track the path determined by the pair of guide cylinders 50a, 55a.

I claim:

1. A self-aligning gear train assembly connecting a pair of coaxially alignable shafts and adapted for effecting linear shifting of a displaceable one of said pair of shafts a selected amount to either side of the coaxial position in response to lateral movement of the displaceable shaft and without interruption of functional gear connection between the pair of shafts, said assembly comprising in combination;
   a first housing carrying a rotary drive shaft and drive gear, and providing an arcuate guideway centered from the axis of said drive shaft and spanning an arcuate distance of approximately 90°, said housing also providing a short linear guideway aligned nonradially transverse to said arcuate guideway;
   a second housing reciprocably movable along a longitudinal guideway of the first housing, which guideway is diametric to the axis of the drive shaft, the second housing carrying a driven shaft and driven gear thus displaceable on movement of the second housing between coaxial alignment with the drive shaft and lateral offset positions on either side thereof along said longitudinal guideway;
   intermediate gear means continuously operatively connecting the drive gear and driven gear, and radially aligned shift means swingable about the axis of the drive shaft and disposed to move the intermediate gear means along said arcuate guideway, whereby the driven gear and driven shaft are displaceable in a diametric line to and from coaxial alignment with the drive gear and drive shaft in accordance with movement of the second housing along the diametric guideway;
   and a link element transversely connecting the intermediate gear means and the driven shaft, said link element carrying pivot means adjacent its intermediate gear end, which pivot means are pivotally functional only while moving along said short linear guideway of the first housing, which guideway is thus transiently traversed by said pivot means upon passage of the driven shaft between a lateral offset position and a position of coaxial alignment.

2. An assembly according to claim 1 wherein said radially aligned shift means comprises a rotary plate disposed along a plane which terminally separates adjacent ends of the pair of shafts, which plate offcenter journals an axle of the intermediate gear means whereby the latter is accordingly shiftable along the arcuate guideway by limited arcuate rotation of said plate.

3. An assembly according to claim 2 wherein said rotary plate is formed with an annular boss surrounding said intermediate gear means and one end of said link element is rotatable about said boss and hence is movable along the arcuate path upon rotation of said plate.

4. An assembly according to claim 1 wherein said second housing carries a rotary tool operable by said driven shaft.

5. An assembly according to claim 4 wherein said rotary tool is disposed in a tiltable positioning head which is carried by the second housing and said positioning head is tiltable about the axis of a bevel gear which forms part of transmission means operatively connecting the driven shaft and the rotary tool.

6. An assembly accordng to claim 1 wherein said first housing carries a motor adapted to operate said rotary drive shaft.

7. An assembly according to claim 6 which includes means for moving said first housing helically, whereby a rotary tool carried by said second housing can cut threads on cylindrical workpieces of varied radii by positioning of the second housing along the longitudinal guideway to accommodate the radius of a particular workpiece.

8. An assembly according to claim 7 which includes means for varying the pitch of the threads being cut.

9. An assembly according to claim 4 which includes means for operative connection of said rotary drive shaft to the spindle of a milling machine.

10. An assembly according to claim 5 which includes means for operative connection of said rotary drive shaft to the spindle of a milling machine.

11. A rotary power drive train assembly comprising in combination:
 a rotary drive shaft adapted for operation by a source of rotary power;
 self-aligning spur gear train means connecting the drive shaft with a driven shaft and including guide means for displacing the driven shaft transversely and linearly to either side of coaxial alignment with the drive shaft without interruption of functional gear connection between said shafts; and
 a tool-holding spindle operatively connected to the driven shaft.

12. An assembly according to claim 11 wherein a rotary tool is functionally held by said spindle, and including means adapted to tilt and hold said spindle adjustably positionable along an arc radiused from a tilt axis of the spindle, whereby the cutting edge of a selected tool is thus angularly disposable relative to a radian bisecting said arc.

13. An assembly according to claim 11 wherein said source of rotary power comprises an electric motor, and including guide means for directing said motor and drive shaft in a curved path, and slide contact means for connecting said electric motor to a fixed source of electric current.

14. An assembly according to claim 11 which includes a base and a housing connected thereto by means for disposing same rotatably and axially displaceable from the base, said housing carrying an electric motor comprising said source of rotary power,
 a pair of radially separated conductor rings carried by each of said base and said housing, the corresponding members of each pair being disposed in annular sliding engagement with each other, said base being formed with a pair of longitudinally directed channels aligned with the respective members of an adjacent pair of rings,
 a longitudinally displaceable conductor rod disposed in each channel in electrical contact with the adjacent ring,
 and electric contact means carried by the base for sliding engagement with the respective longitudinally movable conductor rods, whereby electric current may be continuously supplied to said electric motor while the latter is carried by the housing in a curved path.

15. An assembly according to claim 6 wherein said motor is an electric motor and which assembly includes a base and a pair of radially separated conductor rings carried by each of said base and said first housing, the corresponding members of each pair being disposed in annular sliding engagement with each other, means for selectively displacing the first housing rotatably and axially to the base, said base being formed with a pair of longitudinally directed channels aligned with the respective members of an adjacent pair of rings, a longitudinally displaceable conductor rod carried by said first housing and disposed in each channel in electrical contact with the adjacent ring, and electric contact means carried by the base for sliding engagement with the respective longitudinally movable conductor rods, whereby electric current may be continuously supplied to said electric motor while the latter is carried by the first housing in a displacement path.

16. An assembly according to claim 14 wherein said base and said housing are connected to respective members of a pair of threadedly engaged guide cylinders, the pitch of which threads thus determines the helical path followed by said spindle.

* * * * *